(No Model.) 2 Sheets—Sheet 1.
H. P. HANSEN.
LAWN TRIMMER.
No. 482,307. Patented Sept. 6, 1892.
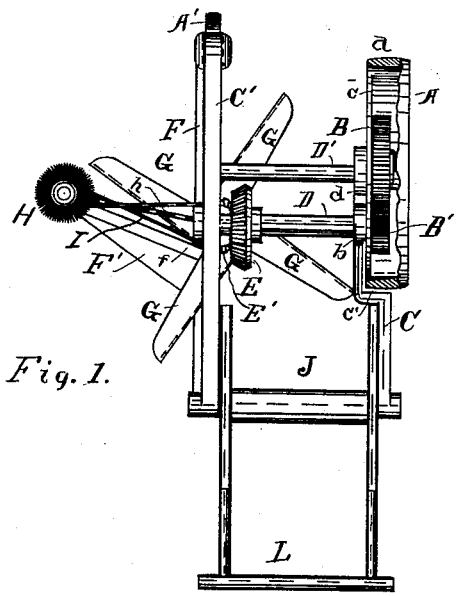
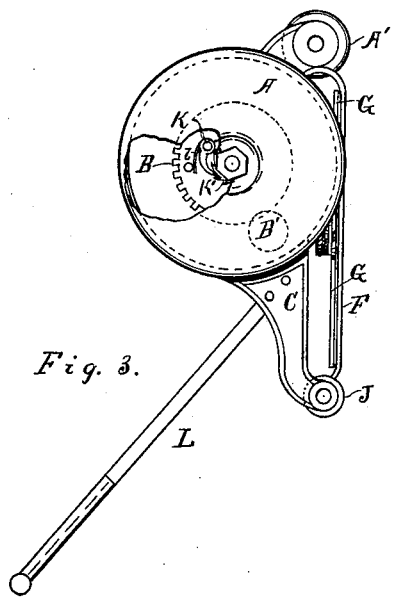
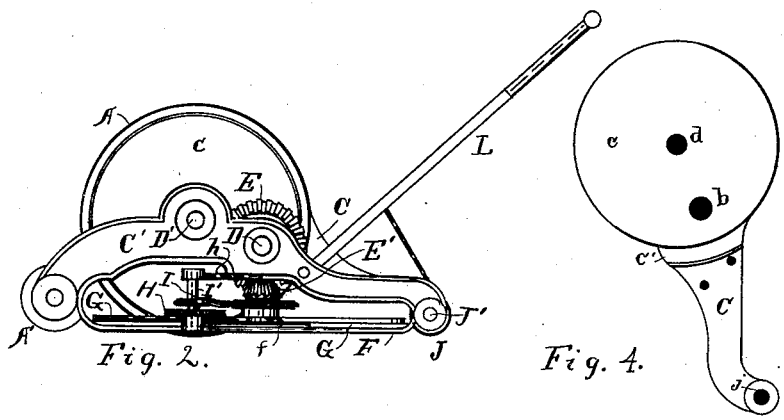
Witnesses:
George H. White.
E. Van Houten
Inventor
Hans P. Hansen
BY
Delwil J. Cilley
Attorney.

(No Model.) 2 Sheets—Sheet 2.
H. P. HANSEN.
LAWN TRIMMER.
No. 482,307. Patented Sept. 6, 1892.
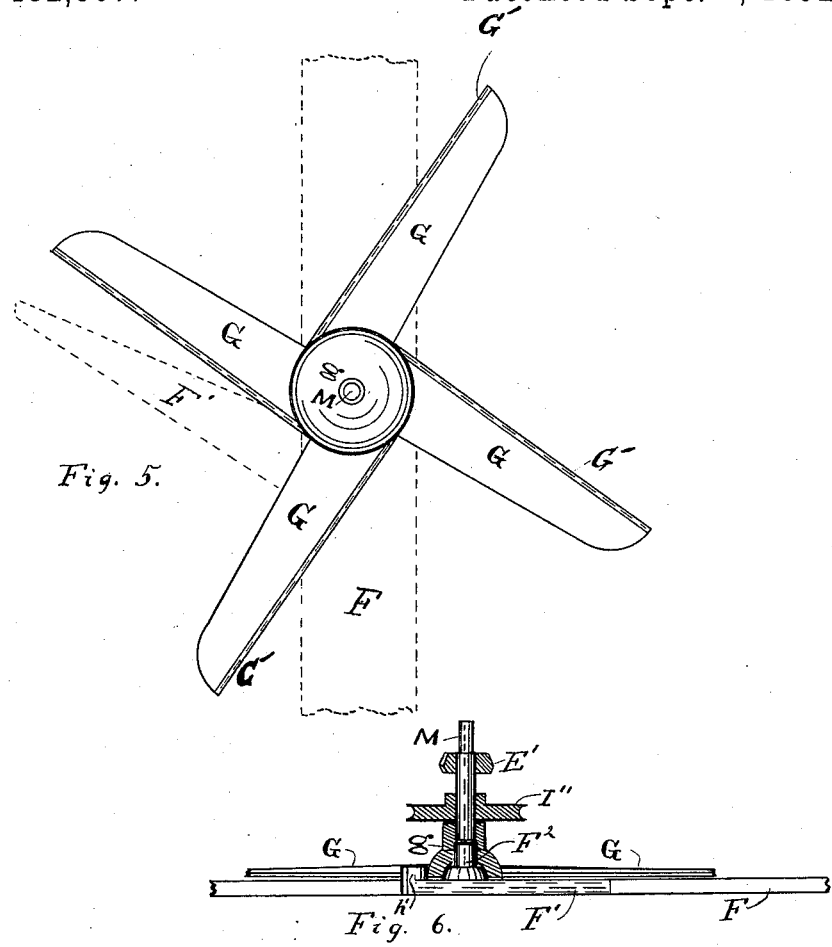
Fig. 5.
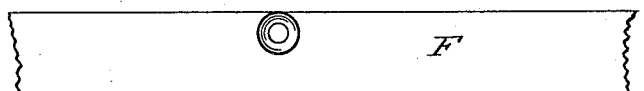
Fig. 6.
Fig. 7.
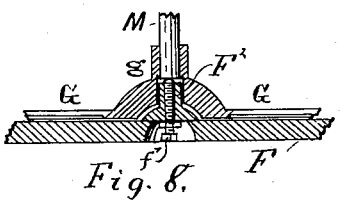
Fig. 8.
Witnesses:
George H. White.
E. Van Houten
Inventor
Hans P. Hansen
BY
Ethiel J. Lilley
Attorney.

UNITED STATES PATENT OFFICE.

HANS PETER HANSEN, OF GRAND RAPIDS, MICHIGAN.

LAWN-TRIMMER.

SPECIFICATION forming part of Letters Patent No. 482,307, dated September 6, 1892.

Application filed June 4, 1892. Serial No. 435,552. (No model.)

*To all whom it may concern:*

Be it known that I, HANS PETER HANSEN, a citizen of the United States, residing at Grand Rapids, in the county of Kent and State of Michigan, have invented certain new and useful Improvements in Lawn-Trimmers, of which the following is a specification.

My invention relates to improvements in implements for clipping or mowing the grass upon lawns, &c.; and its object is to trim the grass at the edges of lawns next to fences, hedges, and other places where an ordinary lawn-mower will not operate successfully. I attain this result by the mechanism illustrated in the accompanying drawings, in which—

Figure 1 is a plan view of my appliance. Fig. 2 is an elevation of the same, showing the relative positions of the brush, knives, &c. Fig. 3 is an elevation of the opposite side of the machine, showing the manner of engaging and disengaging the knife-driving mechanism. Fig. 4 is a side elevation of the supporting-frame. Fig. 5 is an enlarged plan of the revolving knives and knife-frame with the lower support and the stationary knife shown in outline. Fig. 6 is a vertical section of the knife-frame, &c. Fig. 7 is a plan of the knife-supporting girt broken from the machine, and Fig. 8 shows my appliance for adjusting the knives.

Similar letters refer to similar parts throughout the several views.

The driving mechanism of my device consists of a broad-faced traction-wheel A, the periphery of which forms a projecting rim $a$, which serves the double purpose, first, of a traction surface, and, second, of a shield to protect the gear-wheels B and B'. This traction-wheel is supported and turns freely upon the shaft D', which I prefer to have rigidly attached to the frame C C' of the machine. Within this traction-wheel I place a gear-wheel B, supported upon the shaft that supports the wheel A and arranged to turn freely thereon, but provided with a spring-pawl K, arranged to engage with ratchet-teeth K' or other suitable device to transmit the motion of the traction-wheel to the toothed or geared wheel when the machine is being run forward to trim grass, and to allow the toothed wheel to remain idle when the machine is being drawn backward in the usual manner. I also place within the traction-wheel, in position to engage with the toothed or geared wheel B, a second gear-wheel B', which is smaller than B and is securely attached to the shaft D, the opposite end of the shaft being provided with a bevel-gear E, arranged to mesh with a smaller bevel-gear E', which in turn is attached to the shaft M, that supports the revolving knife-frame G, the shaft D being arranged to turn freely in antifriction-bearings in the side frames C C', and the whole arranged to transmit the forward motion of the traction-wheel A to the revolving knife-frame with increased velocity.

The side C of the frame is provided with a circular cap $c$, fitted to enter within the flange $a$ of the traction-wheel and avert the danger of grass, dust, &c., interfering with the free action of the gear-wheels B and B', and is provided with bearings $b$ and $d$ for the reception and support of the shafts D and D', while the opposite side C' of the frame is fitted to receive the opposite ends of the shafts, as at D D', Fig. 2, and is provided with a small wheel A', which is designed to support the side of the frame and to facilitate the working of the machine, the opposite end of the frame being supported upon a roller J, the entire machine being supported upon said wheels A and A' and the roller J and firmly united by means of the shaft D' and the shaft J', that supports the roller J. The side C' of the frame is provided with a shoe F for the support of the revolving knife-frame G, said shoe being provided with a projecting arm F', that inclines ahead and is fitted to receive and support the stationary knife $f$, and the outer end is provided with a bearing $h'$ for the support and free action of the brush H.

The revolving knives G' are supported upon a suitable frame G, and instead of their edges radiating from the center of the shaft M that carries them they stand tangential from the rim of the hub $g$, so that they will produce a perfect shearing cut with the stationary knife $f$, as indicated in Figs. 1 and 5. I find the most convenient manner of supporting the frame G, that carries the revolving knives G', is to make the bottom of the hub $g$ hollow and fit a working bearing therein to receive the short shaft F², as indicated in Fig. 6, securely attaching the upper end to a shaft M, the upper end of which is supported in an antifriction-box upon the frame. (Not shown in the drawings.) Upon the shaft M, I secure the bevel-gear E', and also a pulley I", designed to transmit motion through the belt I to the shaft I', that supports the brush H, the upper end of said shaft I' being supported by the brace h, extending therefrom to the side of the frame and provided with an antifriction-bearing for the reception thereof. The brush H revolves in a direction opposite that of the knives and is designed to draw the grass that is close to a fence or wall out and throw it in position to be cut by the knives.

I provide for adjusting the revolving knives by means of a set-screw $f'$, that passes through the bearing $F^2$ and supports the weight of the knife-frame G, as indicated in Fig. 8.

As the main feature of my invention consists in the peculiar construction and operation of the knives and brush, I do not desire to restrict myself to the specific form of supporting-frame and power-transmitting mechanism herein described and shown; but What I do claim as new, and desire to secure by Letters Patent of the United States, is—

1. In a lawn-trimmer, a traction-wheel supported upon a shaft, gear-wheels within said traction-wheel, provided with a clutching device for transmitting the motion of the traction-wheel and shafts, in combination with bevel-gears, revolving knives supported upon a vertical shaft, a stationary knife, and a revolving brush, substantially as and for the purpose set forth.

2. The combination, in a lawn-trimmer, of a supporting-frame having a traction-wheel provided with an overreaching rim for the protection of the power-transmitting mechanism, gear-wheels within said traction-wheel, and a shaft extending from one of said gear-wheels across the frame and provided at the opposite end with a bevel-gear, a vertical shaft provided at its upper end with a bevel-gear, a knife-frame securely attached to the lower end of the vertical shaft, a series of revolving knives, an adjusting-screw for said frame, a shoe for supporting the knife-frame, said shoe provided with a forwardly-inclined projecting arm for the support of a stationary knife, a stationary knife, a revolving brush, and rollers for the support of the mower-frame, substantially as and for the purpose set forth.

3. The combination, in a lawn-trimmer, of a supporting-frame having a traction-wheel, supporting-rollers, and power-transmitting mechanism, with an outwardly-projecting stationary knife, revolving knives supported above said stationary knife upon a vertical shaft, the edges of said knives being tangential from the rim of the hub $g$ of the frame that supports them, so as to form a perfect shearing cut with the stationary knife, an adjusting-screw, and a revolving brush, substantially as and for the purpose set forth.

4. The combination, in a lawn-trimmer, of a supporting-frame having power-transmitting mechanism, with an outwardly-projecting forwardly-inclined horizontal stationary knife, a revolving brush, and a series of revolving knives supported upon a vertical shaft and arranged to co-operate with the stationary knife in producing a shearing cut, substantially as and for the purpose set forth.

Signed at Grand Rapids, Michigan, this 31st day of May, A. D. 1892.

HANS PETER HANSEN.

In presence of—
GEORGE H. WHITE,
ITHIEL J. CILLEY.